United States Patent Office 3,479,723
Patented Nov. 25, 1969

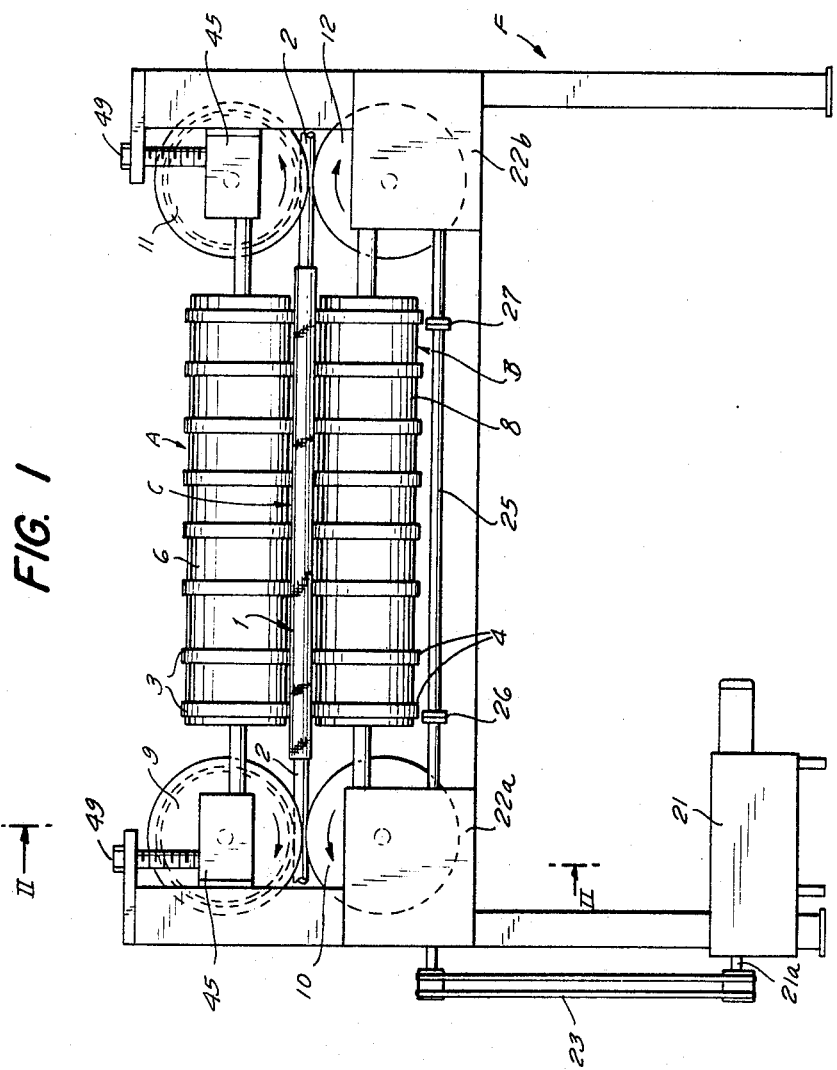

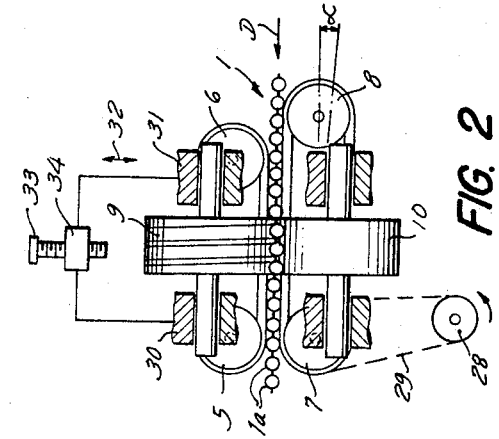
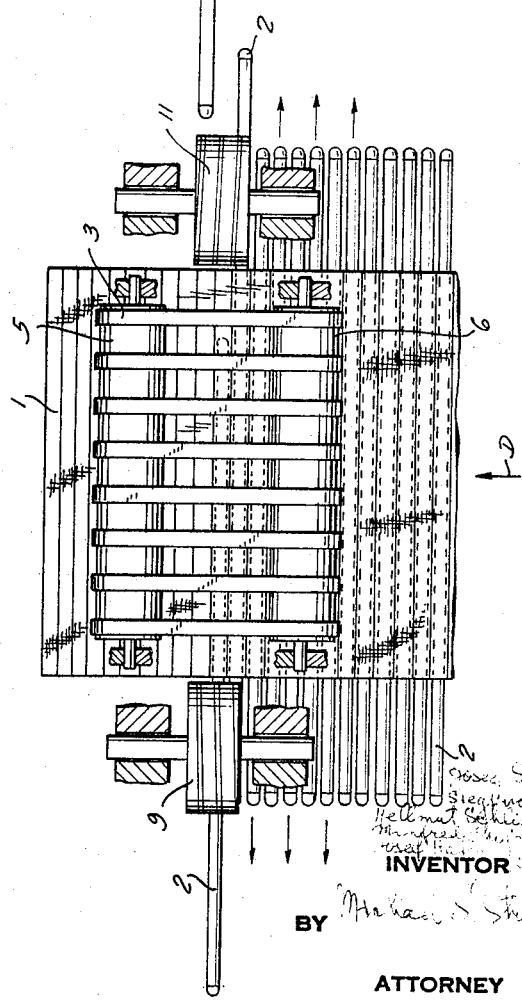

3,479,723
MACHINE FOR WITHDRAWING RODS FROM TEXTURE MATS OR THE LIKE
Josef Sucher, Hagen, Siegfried Werner, Port Elizabeth, Hellmut Schlosser, Wickede, and Manfred Chojnowski and Josef Hain, Hagen, Germany, assignors to Varta Aktiengesellschaft, Frankfurt am Main, Germany
Filed Oct. 11, 1967, Ser. No. 674,626
Int. Cl. B23p 19/02
U.S. Cl. 29—241
29 Claims

ABSTRACT OF THE DISCLOSURE

A machine for withdrawing contour rods from the pockets of texture mats which are utilized to accommodate electrodes in electric storage cells. The machine comprises two sets of endless belts which are trained around pulleys and define a channel in which the mats travel lengthwise so that the ends of rods in their pockets extend beyond the lateral edges of the mats. Two pairs of withdrawing wheels are provided adjacent to the edges of the mats and one wheel of each pair has a threaded rim defining alternating shallower and deeper rod-receiving grooves. When the end portion of a rod enters a shallower groove, such rod is withdrawn in response to rotation of the wheels about axes which are normal to the axes of pulleys for the belts. The shallower grooves of one rim register with the deeper grooves of the other rim so that one pair of wheels extricates rods from oddly numbered pockets and the other pair of wheels extricates rods from the evenly numbered pockets of a mat. At least some pulleys and at least some withdrawing wheels are adjustable.

Background of the invention

The present invention relates to a machine for withdrawing elongated rod-like bodies from parallel pockets of texture mats or the like. More particularly, the invention relates to a machine which is particularly suited to withdraw rods from parallel pockets of texture mats or like carriers which are used in certain types of electric storage cells wherein the pockets receive rod-shaped electrodes consisting of brittle material.

In accordance with heretofore known procedure, straight contour rods which are employed in the manufacture of woven texture mats for use in storage cells are withdrawn by hand. This is a tedious and time-consuming procedure.

Summary of the invention.

It is an object of our invention to provide a machine which can automatically withdraw contour rods from the pockets of texture mats.

Another object of the invention is to provide a machine which can withdraw contour rods from a traveling mat.

A further object of the invention is to provide a machine which is capable of automatically loosening the rods in their pockets prior to withdrawal from the mat.

An additional object of the invention is to provide a machine which is capable of withdrawing contour rods without damage to or deformation of the mat.

Still another object of the invention is to provide a machine which can withdraw rods at any one of a range of practical speeds and which can be readily adjusted to withdraw rods of different diameters.

A further object of the invention is to provide a machine which can be manipulated by persons having little skill and which can be adjusted in operation to account for differences in forces with which the rods adhere to the material of a mat.

An ancillary object of the invention is to provide novel withdrawing devices which can be used in a machine of the above outlined character.

A concomitant object of the invention is to provide a novel feed which causes the mats to travel past one or more withdrawing stations in a machine of the above outlined type.

A more specific object of our invention is to provide simple adjusting devices which can be utilized to regulate the operation of the feed and of the withdrawing device or devices in the novel machine.

Briefly outlined, our invention is embodied in a machine which is utilized to withdraw or extricate preferably straight rods of circular cross-sectional outline from texture mats or other sheet-like carriers wherein the rods are received in a succession of substantially parallel pockets and have end portions extending beyond at least one but preferably beyond both lateral edges of the carrier. The machine comprises basically a feed arranged to guide a carrier or a series of successive carriers for movement along a predetermined path wherein the rods travel sideways, and withdrawing means adjacent to one or both lateral edges of the carrier and operative to extricate the rods lengthwise. The arrangement is preferably such that the withdrawing means comprises helical withdrawing portions which are arranged to perform a composite movement having a component in the direction of advance of the carrier and a component which is normal to such directions, i.e., which is parallel to the longitudinal direction of the rods, so that the rods are extricated lengthwise while the carrier advances along its predetermined path. Such helical withdrawing portions may be provided on the rims of withdrawing wheels which rotate about axes extending at right angles to longitudinal directions of the traveling rods.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a somewhat schematic front elevational view of a machine which embodies our invention;

FIG. 2 is a sectional view as seen in the direction of arrows from the line II—II of FIG. 1;

FIG. 3 is a top plan view of the machine with certain parts broken away;

FIG. 4 is an enlarged fragmentary axial sectional view of a withdrawing wheel having a threaded rim;

FIG. 5 is a similar view of a modified withdrawing wheel;

Description of the preferred embodiments

Figure 6:
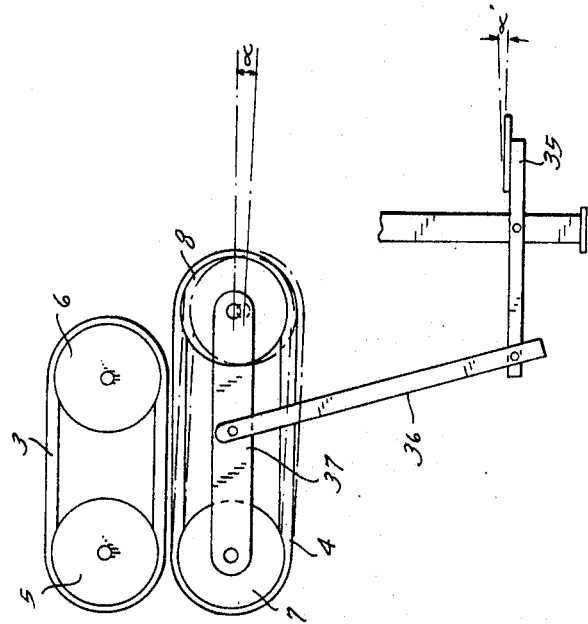
FIG. 6 is a fragmentary schematic side elevational view of the machine.

Referring first to FIGS. 1 to 3, there is shown a machine whose feed for a flexible texture mat or carrier 1 comprises two feed conveyors including an upper feed conveyor A and a lower feed conveyor B. The upper feed conveyor A comprises two pulleys 5, 6 and a set of endless flexible elements in the form of V-belts 3 having inner portions extending into circumferential grooves of the pulleys 5, 6 and outer portions extending radially beyond such grooves. The lower feed conveyor B comprises two pulleys 7, 8 and a set of endless flexible conveying elements in the form of V-belts 4 which are mounted on the pulleys 7, 8 in the same way as described in connection with the belts 3. The lower stringers of the belts 3 are shorter than the upper stringers of the belts 4 because the distance between the lower pulleys 7, 8 exceeds the distance between the upper pulleys 5, 6. These upper and lower stringers define between themselves an elongated horizontal passage or channel C in which the mat 1 advances lengthwise so that the contour rods 2 in its pockets 1a extend transversely of the direction of mat travel (see the arrows D). In other words, the rods 2 travel sideways and each thereof is so long that both its end portions extend beyond the respective lateral edges of the mat 1.

The withdrawing or extracting device of our machine comprises two withdrawing units which are disposed between the intake end (below the pulley 6) and the discharge end (between the pulleys 5, 7) of the channel C. One of these units includes a pair of withdrawing wheels 9, 10 and the other unit includes a pair of withdrawing wheels 11, 12. The wheels of each pair rotate in opposite directions (see the arrows in FIG. 1) which are selected in such a way that the rods 2 are automatically withdrawn lengthwise when the mat 1 is set in motion (arrows D) and the wheels 9–12 are driven to rotate about axes which are normal to the longitudinal directions of the rods. Furthermore, the rims of the upper wheels 9, 11 preferably consist of steel or other suitable wear-resistant metallic material and are provided with multiple helical threads (shown in FIG. 4 for the rim 9a of the wheel 9) which define shallower helical grooves 15 alternating with deeper helical grooves 16. The shallower grooves 15 of the rim 9a are in registry with the deeper grooves 16 of the rim of the wheel 11 and vice versa, and the depth of grooves 16 is such that, when one of these grooves receives the adjoining end portion of a rod, the corresponding wheels 9, 10 or 11, 12 cannot dislodge such rod from its pocket 1a. However, when the end portion of a rod 2 enters one of the shallower grooves 15, the corresponding wheel 9 or 11 cooperates with the associated wheel 10 or 12 and extricates the rod from the respective pocket 1a by moving the rod lengthwise. Since the shallower and deeper grooves 15, 16 of the wheel 9 respectively register with the grooves 16, 15 of the wheel 11, the two withdrawing units automatically extricate rods in such a way that each rod which is accommodated in an oddly numbered pocket 1a of the travelling mat 1 is withdrawn beyond one lateral edge and each rod which is received in an evenly numbered pocket 1a is withdrawn beyond the other lateral edge of the mat 1 before the respective pockets reach the discharge end of the channel C. Such mounting of the wheels 9–12 is preferred at the present time but it is also possible to employ only the wheels 9, 10 or 11, 12 and to provide the rim 9a of the wheel 9 or the rim of the wheel 11 with threads which are capable of withdrawing successive rods 2. It is also possible to place two or more withdrawing units adjacent to one lateral edge of the mat 1 or to employ two or more withdrawing units along one lateral edge and one or more such units along the other edge of the mat. All such modifications of the illustrated machine are so obvious that their functioning will be readily understood without necessitating additional illustrations. Furthermore, and as shown in FIG. 5, the rims of the wheels 9 and 11 may be provided with threads which define shallower and deeper helicap grooves 15′, 16′ of polygonal cross-sectional outline, preferably of rectangular or square cross-sectional outline. In each of the embodiments shown in FIGS. 4 and 5, two or more deeper grooves 16 or 16′ may alternate with one, two or more shallower grooves 15 or 15′, or vice versa. Moreover, each threaded rim can be provided with more than two deeper and more than two shallower grooves. For example, the rim 9a shown in FIG. 4 can be provided with four or six grooves 15 and with the same number of grooves 16.

The lower wheels 10 and 12 are provided with rims of wear-resistant elastomeric material which is preferably of the type that produces satisfactory friction when the peripheral surface of the rim on the wheel 10 or 12 engages the adjoining end portion of a contour rod 2. The peripheral surfaces of rims on the lower wheels 10 and 12 are preferably smooth. The profiling of rims on the wheels 9 and 11 depends on the distribution of pockets 1a in the mat 1, and the exact depth and cross-sectional outline of grooves 15, 16 or 15′, 16′ depends on the configuration of contour rods 2.

Of course, the threads on the rim of one of the wheels 9, 11 are left-hand threads and the threads on the other of these wheels are right-hand threads. The wheels 9, 12 receive motion from a common prime mover 21 through the intermediary of a transmission. The output member 21a of the prime mover 21 (which is preferably a variable-speed electric motor) transmits motion to a belt drive 23 which rotates the input member of the transmission. The two gear boxes 22a, 22b of the transmission are connected to each other by a shaft 25 and couplings 26, 27. The operation of the transmission is synchronized with operation of the drive for the feed conveyors A, B (if such a drive is used at all) so that the withdrawing wheels 9–12 extricate contour rods 2 from successive pockets 1a of that mat which travels through the channel C. Since the two withdrawing units extract rods 2 in opposite directions, frictional forces between the pockets 1a and the rods which are withdrawn by the wheels 9, 10 are balanced by frictional forces between the pockets 1a and those rods which are extracted by the wheels 11, 12. This insures that the mat 1 is not moved sideways and that minimal forces are needed to maintain the mat in motion in the path defined by the two sets of belts 3 and 4. In other words, the drive for the feed conveyors A, B must overcome relatively small resistance to movement of the mat in the direction indicated by arrows D. The drive for the feed may include a small motor or transmission 28 (FIG. 2) which is operatively connected with the lower pulley 7 at the discharge end of the channel C by a chain or belt 29. This drive mainly serves to advance the leading end of a fresh mat 1 into the range of withdrawing wheels 9–12. Once a mat reaches the two withdrawing stations, the end portions of its rods 2 are engaged by the respective pairs of wheels 9, 10 and 11, 12 and the wheels thereupon automatically advance the mat lengthwise in a manner similar to that in which the sprocket wheels of a chain drive engage and transport the links of an endless chain. Once engaged, the end portions of rods 2 cannot leave the respective shallower grooves 15 or 15′ and such rods are extricated automatically while the corresponding pockets 1a advance past the withdrawing wheels. Thus, the mat 1 must travel at a speed which is determined by the speed of wheels 9–12 and the drive 28, 29 for the pulley 7 can be brought to a halt without causing stoppage of the mat, as long as the motor 21 drives the withdrawing wheels. Uncontrolled tilting or other undesirable movements of rods 2 are prevented as soon as their end portions enter the nips between the wheels 9, 10 or 11, 12 so that these wheels must only overcome such friction which develops when the rods are extrictated by moving lengthwise.

Once the rods 2 are withdrawn, empty pockets 1a simply advance toward the discharge end of the channel C and issue between the pulleys 5, 7 where the belts 3, 4 are respectively deflected upwardly and downwardly to expose successive increments of the mat 1. Since the forces exerted by wheels 9, 10 during extraction of rods in a direction to the left, as viewed in FIGS. 1 or 3, balance the forces exerted by wheels 11, 12 which extricate the rods in a direction to the right, the belts 3, 4 are not subjected to excessive stresses and can stand long periods of use. The wheels 9–12 are subjected to greater stresses because they must overcome friction between the rods 2 and pockets 1a. Therefore, the wheels 9, 10 and 11, 12 must be sufficiently close to each other to properly grip the rods and to withdraw such rods without slippage. Since the rims of lower wheels 10, 12 preferably consist of elastomeric material, the peripheral surfaces of these rims develop tracks or grooves which are formed on repeated compressive engagement with the end portions of rods. Therefore, the machine is preferably provided with adjusting means for changing the distance between the wheels 9, 10 and 11, 12 in order to compensate for wear and lasting deformation of elastomeric rims on the lower wheels. At the present time, we prefer to adjust the upper wheels 9, 11, i.e., to mount these wheels in such a way that they can be shifted toward and away from the lower wheels 10 and 12. As shown in FIG. 2, the bearings 30, 31 for the shaft of the upper wheel 9 are movable up and down as indicated by a double-headed arrow 32 (for example, by means of a feed screw 33 meshing with a nut 34 which is connected with the bearings 30, 31). The bearings for the shaft of the wheel 11 are adjustable in similar fashion, and the bearings for the shafts of lower wheels 10, 12 are stationary.

The lower pulley 8 at the intake end of the channel C is movable in an arc about the axis of the rear lower pulley 7 in a manner as shown in FIG. 6. The adjusting mechanism for effecting such movements of the pulley 8 includes a foot pedal 35 and a linkage 36 which connects the pedal with a frame 37 for the pulley 8. The latter is movable in a relatively small arc (see the angle alpha) so as to widen the intake end of the channel C and to permit convenient insertion of the leading end of a fresh mat 1. When the mat advances into the range of the wheels 9–12, the pulley 8 is returned to its normal upper end position because the mat is thereupon advanced automatically by the two withdrawing units. The belts 3, 4 grip the pockets 1a and travel therewith in the direction indicated by arrows D. In normal operation, the lower stringers of the upper belts 3 are parallel or nearly parallel to the upper stringers of the lower belts 4.

The distance between the pulleys 5, 6 and 7, 8 is adjustable for a number of reasons, for example, to change the tension of belts 3, 4 and/or to allow for replacement of belts. The bearings 40, 41 (see FIG. 7) for the rear pulleys 5, 7 are provided with elongated slots for the shafts of pulleys 5 and 7. These shafts can be moved lengthwise of the respective slots by means of screws 42, 43 which are mounted on the machine frame F. As a rule, the tension of upper belts 3 will exceed the tension of lower belts 4. This insures that the lower belts can follow more closely the outline of pockets 1a in the channel C.

Figure 7:
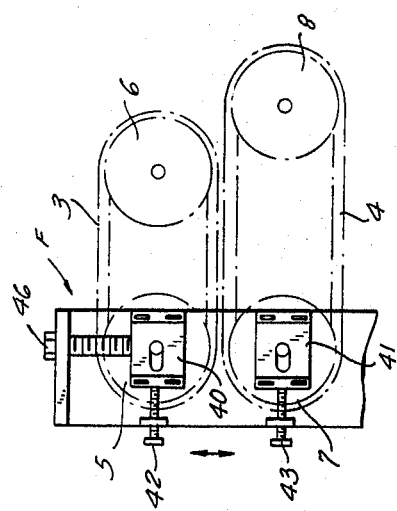
FIG. 7 is another fragmentary schematic side elevational view.

The bearings 40, 45 for the upper pulleys 5, 6 are movable up and down in a manner as shown in FIGS. 7 and 1. The adjusting means for these bearings includes bolts 46 and 49 which are carried by the frame F. Such vertical adjustability of bearings 40, 45 enables an operator to change the width of the channel C and to thus convert the machine for removal of rods from different types of mats.

As stated before, portions of the belts 3 and 4 extend from the annular grooves in the peripheries of pulleys 5 to 8. This insures that the material of the mat 1 is gripped at all times when it travels through the channel C, i.e., also during passage between the rear pulleys 5 and 7. The belts are elastic and, therefore, they cannot damage the mat and/or its pockets. Furthermore, and since the belts extend beyond the peripheries of the pulleys, the pulleys cannot come in direct contact with and cannot damage the mat. This is of importance at the discharge end of the channel C where the pockets 1a not supported from within because the rods 2 are withdrawn upstream of the discharge end. The mat is further protected due to the fact that the upper front pulley 6 is not located directly above the lower front pulley 8. If the diameters of all rods 2 are not the same, the lower belts 4 can yield in the region below the pulley 6. Such mounting of the pulley 6 also permits for convenient adjustment of the direction of mat travel through the channel C. There is no need to compensate for unevennesses in thickness of the mat while the evacuated pockets 1a travel between the pulleys 5 and 7 because the pockets 1a can yield as soon as the rods 2 are withdrawn therefrom.

Each set of belts preferably comprises a large number of belts because this insures more accurate retention of the mat for travel along a predetermined path. FIGS. 1 and 3 show that each set of belts 3 and 4 comprises eight belts disposed in parallel vertical planes and separated from each other by gaps whose width exceeds the width of a belt. Thus, each pocket 1a is supported and engaged at sixteen points. This assumption is warranted because the belts 3 and 4 are elastic so that they can readily compensate for eventual variations in diameters of the rods 2. Furthermore, all of the belts are subjected to the same wear so that it is not necessary to replace one or more belts ahead of the remaining belts. Since the rods 2 are extracted from pockets which are engaged and held against lengthwise movement at sixteen points, the mat 1 continues to travel lengthwise while the wheels 9, 10 and, 11, 12 cooperate to withdraw the rods from successive pockets 1a. The stresses are distributed uniformly in all parts of the mat so that the mat cannot undergo undue deformation. This prevents the concentration of substantial twisting, curling, folding and/or other deforming stresses in localized areas of the mat.

The number and distribution of belts on the feed conveyors A and B will depend on the characteristics of mats. For example, the belts 3 and 4 may be placed sufficiently close to each other to form two continuous carpets bounding the upper and lower sides of the channel C. Such closely adjacent belts will be employed if the material of the mat is strongly deformable, i.e., if it is necessary to guide the the mat at a plurality of closely adjacent points. Also, the number of belts will be higher if the surfaces of rods 2 adhere to the pockets 1a with considerable force. If the mats are relatively stiff, the number of belts can be reduced or the width of gaps between the belts can be increased. In fact, and if the mat is more or less stiff, it suffices to employ a single belt 3 and a single belt 4 or a pair of upper belts and a pair of lower belts.

The resistance which the wheels 9–12 must overcome during extrication of rods 2 depends mainly on friction between the peripheral surfaces of rods and the internal surfaces of the pockets 1a. Friction is higher in regions where the pockets 1a are engaged by the belts 3 and 4. Therefore, the two withdrawing units are preferably located widway between the upper pulleys 5 and 6 wherein the belts 3, 4 are more readily flexible than at the intake and discharge ends of the channel C. This insures that the withdrawing wheels cannot meet excessive resistance and that the material of the mat is not damaged during extraction of rods. If certain portions of the pockets 1a happen to be glued to the adjoining portions of the rods 2, such portions are normally separated from rods due to the action of belts 3 and 4 upstream of the withdrawing station. Thus, the bond formed by adhesive is broken due to changing pressure between the pockets 1a and the belts 3, 4 during travel of pockets from the intake end of the channel C toward the wheels 9 to 12. Minimal tendency of the mat to move laterally from its predetermined path also contributes to destruction of eventual localized bonds between the pockets and the respective rods prior to extraction. Even though the friction between belts 3, 4 and the pockets 1a is lowest in the region between the wheels 9, 10 and 11, 12, such friction can be regulated still further by the operator who controls the position of the foot pedal 35. Even minor changes in the level of the lower front pulley 8 can change the friction sufficiently to permit more convenient extrication of rods 2. Such accurately controlled extrication cannot be achieved by hand so that, in addition to removing more rods per unit of time, the machine of our invention also insures gentler treatment of mats during withdrawal.

The machine can be operated continuously of intermittently, and its controls can be entrusted to persons having little skill. It was found that the machine is particularly suited for extraction of rods from pockets of woven texture mats or sheets which are used in accumulators or the like.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A machine for withdrawing rods from texture mats or other sheet-like carriers wherein the rods are received in a succession of substantially parallel pockets and have end portions extending beyond at least one lateral edge of the carrier, comprising a feed arranged to guide the carrier for movement along a predetermined path wherein the rods travel sideways; and withdrawing means adjacent to said path and arranged to extricate the rods lengthwise.

2. A machine as defined in claim 1, wherein said withdrawing means comprises rod-engaging portions arranged to perform a composite movement having a component in the direction of advance of the carrier and a component at right angles to such direction so that the rods are extricated while the carrier advances along said path.

3. A machine as defined in claim 1, wherein said feed comprises a pair of feed conveyors each including a pair of rotary pulleys and at least one endless conveying element trained around the respective pulleys, said conveying elements having stringers adjacent to and defining with each other a channel for the carrier, said channel having an intake end and a discharge end.

4. A machine as defined in claim 3, wherein said withdrawing means comprises a pair of wheels adjacent to said one lateral edge of the carrier and rotating in opposite directions about axes which are substantially normal to the axes of said pulleys, said wheels forming a nip into which the end portions of rods extend during travel of the respective pockets past said wheels.

5. A machine as defined in claim 4 for withdrawing rods from carriers of the type wherein the end portions of rods extend beyond both lateral edges of the carrier, said withdrawing means further comprising a second pair of wheels adjacent to the other lateral edge of the carrier and rotating in opposite directions about axes which are substantially normal to the axes of said pulleys, each pair of said wheels being arranged to withdraw certain ones of successive rods from the respective pockets.

6. A machine as defined in claim 5, wherein one of each pair of said wheels has a rim of elastically deformable material.

7. A machine as defined in claim 6, wherein said rims consist of friction generating material.

8. A machine as defined in claim 5, wherein one of each pair of said wheels has a rim with multiple threads of different depth.

9. A machine as defined in claim 8, wherein said rims consist of metallic material.

10. A machine as defined in claim 8, wherein said threads define helical grooves of polygonal cross-sectional outline.

11. A machine as defined in claim 5, wherein said withdrawing means further comprises a prime mover having a rotary output member and transmission means connecting all of said wheels with said output member.

12. A machine as defined in claim 5, wherein one wheel of each of said pairs of wheels comprises a rim provided with multiple threads defining helical rod-receiving grooves of greater and lesser depth and wherein the grooves of lesser depth on one of said rims register with grooves of greater depth in the other rim, only the end portions of those rods which extend into the grooves of lesser depth being withdrawn by the respective pairs of wheels.

13. A machine as defined in claim 12, wherein said grooves of lesser depth alternate with said grooves of greater depth so that one of said pairs of wheels withdraws rods from all oddly numbered pockets and the other pair of wheels withdraws rods from all evenly numbered pockets of said succession.

14. A machine as defined in claim 5, wherein each pulley of one of said feed conveyors is located at a level above one pulley of the other feed conveyor and further comprising adjusting means for changing the position of pulleys in said one feed conveyor with reference to the pulleys of said other feed conveyor.

15. A machine as defined in claim 5, wherein one wheel of each of said pairs of wheels is located at a level above the other wheel of the respective pair and further comprising adjusting means for moving said one wheel of each pair with reference to the other wheel of the respective pair.

16. A machine as defined in claim 3, wherein the distance between the pulleys of one of said feed conveyors exceeds the distance between the pulleys of the other feed conveyor so that one of said stringers is longer than the other stringer.

17. A machine as defined in claim 16, wherein said longer stringer is located at a level below said shorter stringer.

18. A machine as defined in claim 3, further comprising means for moving one pulley of one of said feed conveyors in an arc about the axis of the other pulley of said one feed conveyor.

19. A machine as defined in claim 18, wherein said one feed conveyor is located at a level below the other feed conveyor and wherein said one pulley of said one feed conveyor is adjacent to the intake end of said channel.

20. A machine as defined in claim 3, wherein one pulley of each of said feed conveyors is adjacent to the discharge end of said channel and further comprising bearing means adjustably supporting said one pulley of each feed conveyor for movement toward and away from the other pulley of the respective feed conveyor.

21. A machine as defined in claim 20, wherein each of said bearing means is provided with elongated slot means and said one pulley of each feed conveyor comprises shaft means extending into the respective slot means.

22. A machine as defined in claim 3, wherein one pulley of one of said feed conveyors is adjacent to the discharge end of said channel and said feed further comprises drive means for rotating said one pulley.

23. A machine as defined in claim 22, wherein said one feed conveyor is located at a level below the other feed conveyor.

24. A machine as defined in claim 3, wherein said pulleys have circumferential grooves receiving only portions of the respective conveying elements.

25. A machine as defined in claim 24, wherein said conveying elements are V-belts consisting of elastomeric material.

26. A machine as defined in claim 1, wherein said feed comprises two sets of endless belts having adjoining stringers defining a substantially horizontal channel for the carrier and drive means for at least one set of said belts.

27. A machine as defined in claim 26, wherein the belts of each set are separated from each other by gaps.

28. A machine as defined in claim 26, wherein said stringers comprise unsupported portions located opposite each other and said withdrawing means is adjacent to the unsupported portions of said stringers.

29 A machine as defined in claim 28, wherein said belts consist at least in part of elastomeric material and further comprising means for changing the tension of said belts.

References Cited

UNITED STATES PATENTS

| | | | |
|---|---|---|---|
| 1,610,633 | 12/1926 | Swanson | 29—241 |
| 1,709,942 | 4/1929 | Leguillon | 29—427 |
| 3,214,831 | 11/1965 | Shellman | 29—427 |
| 3,289,282 | 12/1966 | Shaffer. | |
| 3,314,131 | 4/1967 | Judge | 29—241 X |

WAYNE A. MORSE, Jr., Primary Examiner

U.S. Cl. X.R.

29—200, 427